United States Patent [19]

Nakatani et al.

[11] Patent Number: 4,511,891
[45] Date of Patent: Apr. 16, 1985

[54] MONEY INFORMATION PRINT CONTROL SYSTEM

[75] Inventors: Hiroshi Nakatani; Hachizou Yamamoto, both of Nara, Japan

[73] Assignee: Sharp Kabushiki Kaisha, Osaka, Japan

[21] Appl. No.: 368,754

[22] Filed: Apr. 15, 1982

[30] Foreign Application Priority Data

Apr. 27, 1981 [JP] Japan .................................. 56-64653

[51] Int. Cl.³ .............................................. G09G 1/00
[52] U.S. Cl. ...................................... 340/734; 340/700; 340/745; 340/749; 400/110
[58] Field of Search ................. 400/110; 340/700, 734, 340/744, 745, 748, 750, 749

[56] References Cited

U.S. PATENT DOCUMENTS

| 3,822,773 | 7/1974 | Van Arnam et al. | 400/110 |
| 4,020,462 | 4/1977 | Morrin | 340/734 |
| 4,173,753 | 11/1979 | Chou | 400/110 |
| 4,193,119 | 3/1980 | Arase et al. | 400/110 |
| 4,373,192 | 2/1983 | Yanagiuchi et al. | 400/110 |
| 4,375,922 | 3/1983 | Maegawa et al. | 400/110 |

Primary Examiner—Marshall M. Curtis
Attorney, Agent, or Firm—Birch, Stewart, Kolasch & Birch

[57] ABSTRACT

A print control system includes an order detection circuit for detecting an effective digit number of numeral information. A converter ROM is provided for developing a character pattern code signal in response to the numeral information and the order information thereof. A dot matrix printer responds to the character pattern code signal so as to print the numeral information through the use of, for example, alphabetical or kana characters derived from Chinese characters.

13 Claims, 4 Drawing Figures

MONEY INFORMATION PRINT CONTROL SYSTEM

BACKGROUND AND SUMMARY OF THE INVENTION

The present invention relates to a print control system and, more particularly, to a print control system for printing numeral information of plural digits as character information including order information.

In the conventional printer system, the numeral information of plural digits is printed out through the use of arabic numerals. Thus, there is a possibility that the numeral information could be misunderstood or that the numeral information might be easily changed. Therefore, the conventional printer system is not suited for printing out the money information on an important bill or check. Especially in Japan, the important money information is manually written on the check through the use of the kana characters derived from Chinese characters.

In order to prevent the above-mentioned misunderstanding or alteration, an emboss type printer is normally used to print important money information. However, the emboss type printer is not suitable for versatile use and may not be purchased at a low cost.

Accordingly, an object of the present invention is to provide a novel print control system for printing out important money information.

Another object of the present invention is to provide a print control system for printing out numeral information of plural digits through the use of characters including order information.

Still another object of the present invention is to provide a print control system for printing out money information through the use of a dot matrix printer.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a 24×24 dot matrix printer is employed for printing out the numeral information of plural digits as the character information including order information. In a preferred form, the numeral information of plural digits is stored in a numeral data memory. An order detection circuit detects the order of the numeral information stored in the numeral data memory. The numeral data and the order data are applied to a converter circuit which converts the numeral information into character information including order information. The thus obtained character information is transferred to the matrix printer.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
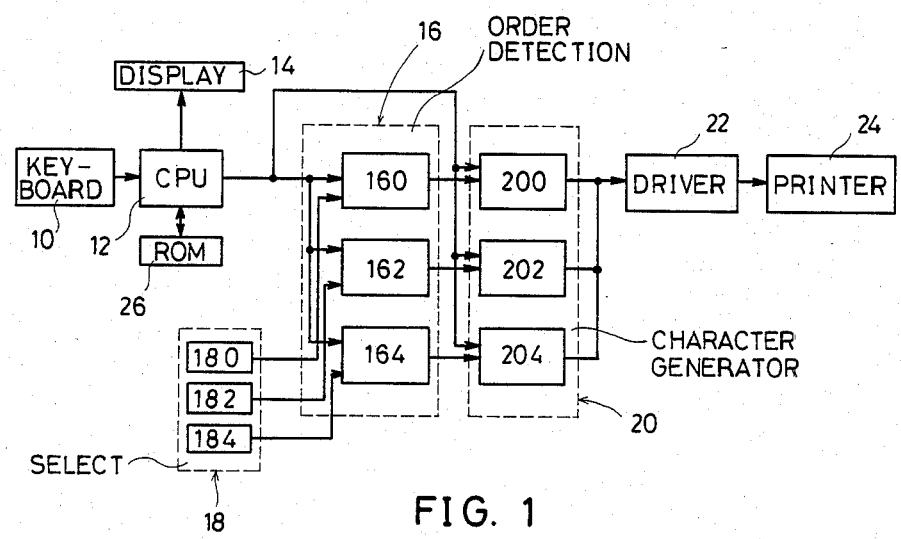
FIG. 1 is a schematic block diagram of an embodiment of a print control system of the present invention.

A printer system of the present invention includes a keyboard panel 10 for introducing numeral information through ten numeral keys. The numeral information introduced from the keyboard panel 10 is transferred to a central processor unit 12 which includes a memory for temporarily storing the introduced numeral data. A display unit 14 is connected to the central processor unit 12 for displaying the introduced numeral data. An order detection circuit 16 is connected to the central processor unit 12 for detecting the order of the numeral data temporarily stored in the central processor unit 12. The order detection circuit 16 includes a first order detection circuit 160 for dividing the numeral data into desired digit groups suited for an English language representation, a second order detection circuit 162 for dividing the numeral data into desired digit groups suited for a German language representation, and a third order detection circuit 164 for dividing the numeral data into desired digit groups suited for a Japanese language representation. A language selection unit 18 is associated with the order detection circuit 16. When an English language switch 180 included in the language selection unit 18 is actuated, the first detection circuit 160 is enabled. When a German language switch 182 included in the language selection unit 18 is actuated, the second detection circuit 162 is enabled. When a Japanese language switch 184 included in the language selection unit 18 is actuated, the third detection circuit 164 is enabled.

An output signal derived from the order detection circuit 16 is introduced into a character information converting circuit 20 which develops a character pattern code signal representing the numeral data temporarily stored in the central processor unit 12. The character information converting circuit 20 includes a first converter 200 associated with an English language operation, a second converter 202 associated with a German language operation, and a third converter 204 associated with a Japanese language operation. The character pattern code signal developed from the character information converting circuit 20 is applied to a printer driver circuit 22 which controls a printer 24, thereby printing the numeral data through the use of characters other than the arabic numerals. The printer 24 is preferably made of a dot matrix printer which forms one character by a matrix of 24×24 dot positions. A read only memory 26 is connected to the central processor unit 12 for controlling the system operation of the printer system.

Figure 2:
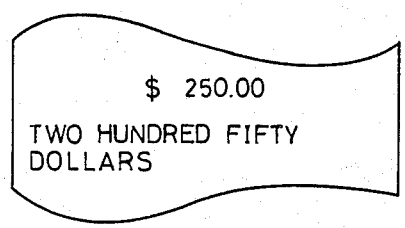
FIG. 2 is a plan view showing an example of a printout produced by the print control system of FIG. 1.

Desired numeral information to be printed out is introduced into the central processor unit 12 from the keyboard panel 10. Now assume that the numeral keys 2, 5 and 0 are actuated to introduce the numeral information "250" into the central processor unit 12. The thus introduced numeral information "250" is displayed on the display unit 14, and the numeral data "250" is applied to the order detection circuit 16. When the English language operation is selected by the English language switch 180, the order detection circuit 160 and the first converter 200 are energized, whereby a printout shown in FIG. 2 is developed by the printer 24.

Figure 3:
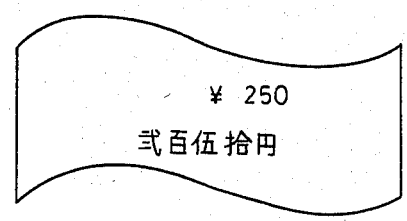
FIG. 3 is a plan view showing another example of a printout produced by the print control system of FIG. 1.

When the Japanese language operation is selected by the Japanese language switch 184, the order detection circuit 164 and the third converter 204 are energized, whereby a printout shown in FIG. 3 is developed by the printer 24.

Figure 4:
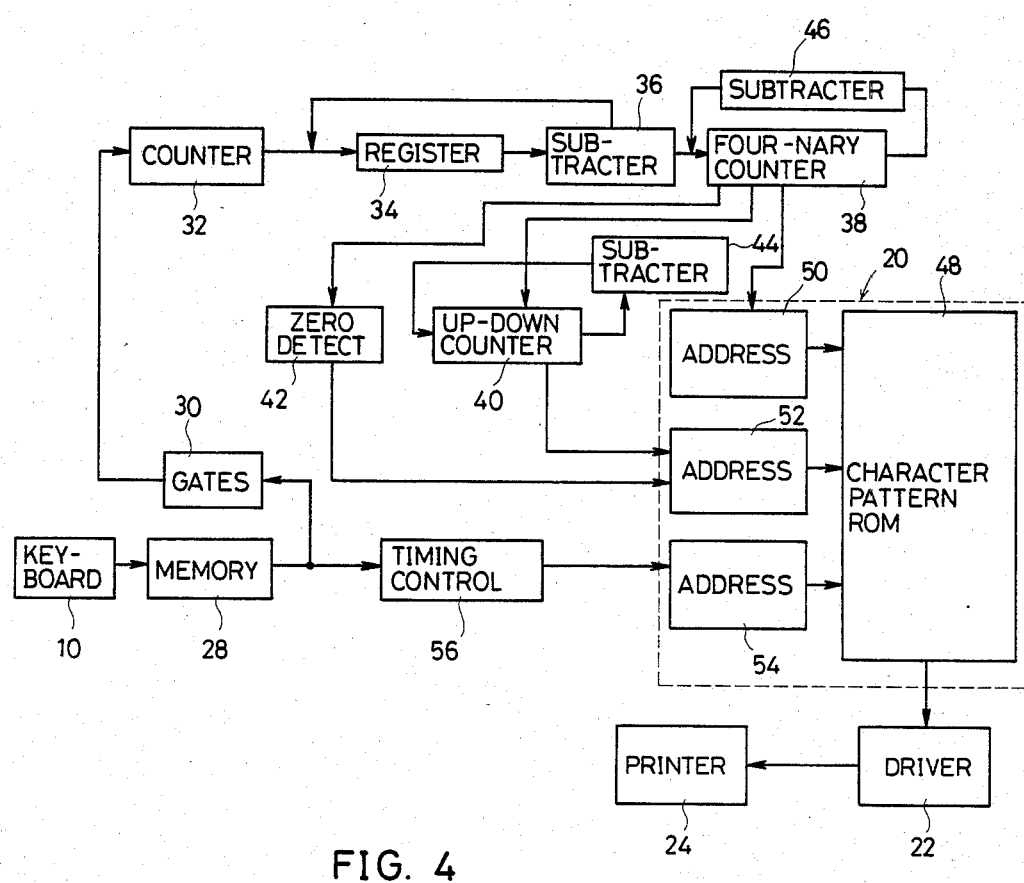
FIG. 4 is a block diagram of an essential part of the print control system of FIG. 1.

FIG. 4 shows a detailed construction of the print control system of FIG. 1 related to the Japanese language operation. Like elements corresponding to those of FIG. 1 are indicated by like numerals.

As already discussed above, the numeral data introduced from the keyboard panel 10 is temporarily memorized in a numeral data memory 28. The numeral data stored in the numeral data memory 28 is applied to a gate circuit 30 which functions to determine an effective digit number of the numeral data. The determination result of the gate circuit 30 is introduced into a counter 32 so that the counter 32 stores the effective digit number of the numeral data temporarily stored in the numeral data memory 28. When, for example, numeral information "30425" is introduced from the keyboard panel 10 into the numeral data memory 28, a count number "5" is stored in the counter 32. The count number stored in the counter 32 is transferred to a register 34. A subtracter 36 is connected to the register 34 for repeatedly subtracting "1" from the contents stored in the register 34. A four-nary counter 38 is connected to the subtracter 36 so that the contents stored in the four-nary counter 38 are increased by one upon every subtraction operation conducted by the subtracter 36. That is, the four-nary counter 38 functions to divide the effective digits of the introduced numeral data into one or more groups, each group consisting of four digits suited for Japanese language representation. An up-down counter 40 is connected to the four-nary counter 38 so that the contents stored in the up-down counter 40 are increased by "1" when a carry signal is developed from the four-nary counter 38. Accordingly, if the up-down counter 40 stores data "1", the numeral data has the order of " " ("man" corresponding to ten thousand). When the up-down counter 40 stores data "2", the introduced numeral data has the order of " " ("oku" corresponding to hundred million). When the up-down counter 40 stores data "3", the numeral data has the order of " " ("chou" corresponding to trillion). When the contents stored in the four-nary counter 38 are "0", the numeral data has the order of $10°$. When the contents stored in the four-nary counter 38 are "1", the numeral data has the order of " " ("ju" corresponding to $10^1$). When the contents stored in the four-nary counter 38 are "2", the numeral data has the order of " " ("hyaku" corresponding to hundred). If the contents stored in the four-nary counter 38 are "3", the numeral data has the order of " " ("sen" corresponding to thousand).

A zero detection circuit 42 is connected to the four-nary counter 38 for detecting whether the contents stored in the four-nary counter 38 are zero. A subtracter 44 is provided for decreasing the contents stored in the up-down counter 40 by "1". Another subtracter 46 is provided for decreasing the contents stored in the four-nary counter 38 by "1".

The character information converting circuit 20, more specifically, the third converter 204, includes a character pattern ROM 48 for storing a pattern code signal for printing a desired character in a dot matrix of 24×24 dot positions. The character information converting circuit 20 further includes a first address circuit 50 for selecting a character pattern code signal representing the order information consisting of the order of $10^0$, $10^1$ (" "), $10^2$ (" ") and $10^3$ (" "). A second address circuit 52 is provided for selecting a character pattern code signal representing the four order information including the order of $10^4$ (" "), $10^8$ (" ") and $10^{12}$ (" "). A third address circuit 54 is provided for selecting a character pattern code signal representing the numeral information consisting of " " ("ichi" corresponding to "1"), " " ("ni" corresponding to "2"), " " ("san" corresponding to "3"), " " ("yon" corresponding to "4"), " " ("go" corresponding to "5"), " " ("roku" corresponding to "6"), " " ("nana" corresponding to "7"), " " ("hachi" corresponding to "8") and " " ("kyu" corresponding to "9"). The third address circuit 54 receives the numeral data temporarily stored in the numeral data memory 28 via a timing control circuit 56.

The operational mode of the print control system of FIG. 4 is as follows.

When the numeral data is introduced into the numeral data memory 28, the counter 32 performs its function and the order information is stored in the four-nary counter 38 and the up-down counter 40. Then, the numeral data of the highest digit N is applied to the third address circuit 54 via the timing control circuit 56. The third address circuit 54 selects the memory address in the character pattern ROM 48 storing the character pattern code signal corresponding to the numeral data now applied to the third address circuit 54. The thus selected character pattern code signal is applied to the printer 24 via the printer driver circuit 22, whereby the numeral of the highest digit N is printed by the Chinese character. Then, the contents stored in the four-nary counter 38 are applied to the first address circuit 50. The character pattern ROM 48 develops the character pattern code signal in accordance with the selection data developed from the first address circuit 50, the character pattern code signal being for printing the order representing character " ", " " or " ". Then, the contents stored in the four-nary counter 38 are decreased by one by means of the subtracter 46.

After completion of the print operation of the numeral information and the order information of the highest digit N, the numeral data of the second highest digit N-1 is applied from the numeral data memory 28 to the third address circuit 54 via the timing control circuit 56. The contents stored in the four-nary counter 38 is applied to the first address circuit 50 for printing the order information of the second highest digit N-1. When the contents stored in the four-nary counter 38 are zero, the contents stored in the up-down counter 40 are applied to the second address circuit 52 for printing the four order information such as " ", " " and " ". The above-mentioned operation is repeated to print the numeral information and the order information through the use of the Chinese characters.

When the numeral information "0" is introduced into the third address circuit 54, the character pattern selection is not conducted so that neither the numeral information nor the order information of the corresponding digit is printed out. The contents stored in the four-nary counter 38 are therefore decreased by one to prepare for the printing operation of the next lower digit.

When, for example, numeral data "123456789" is introduced from the keyboard panel 10 into the numeral data memory 28, is printed out by the printer 24.

NOTE:
" " ("ichioku") represents one hundred million
" " ("nisen") represents twenty million
" " ("sanbyaku") represents three million
" " ("yonju") represents four hundred thousand
" " ("goman") represents fifty thousand
" " ("rokusen") represents six thousand
" " ("nanahyaku") represents seven hundred
" " ("hachiju") represents eighty
" " ("kyu") represents nine.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A system for converting amount information of plural digits from a numeric to a non-numerical symbolic representation thereof comprising:
    means for introducing amount information represented as a numerical character string;
    means for determining the order position of each numerical character representing said amount information;
    means, responsive to the order position of each numerical character determined by said means for determining, for generating non-numerical symbology representative of the order position of said amount information.

2. The system of claim 1 wherein said means for introducing includes numerical data memory means for storing said numerical character string representing said amount information.

3. The system of claim 2 further comprising timing control means for supplying the numerical character string stored in said numerical data memory means to said means for converting one numerical character at a time.

4. The system of claim 1 wherein said non-numerical symbology consists essentially of alphabetical characters.

5. The system of claim 1 wherein said non-numerical symbology is of the English, German or Japanese languages.

6. A system for converting amount information of plural digits from a numeric to a non-numerical symbolic representation thereof comprising:
    means for introducing amount information represented as a numerical character string;
    means for determining the order position of each numerical character representing said amount information;
    means, responsive to the order position of each numerical character determined by said means for determining, and to the value of each said numerical character, for generating non-numerical symbology representative of the value and order position of said amount information.

7. The system of claim 6 wherein said non-numerical symbology consists essentially of alphabetical characters.

8. A printing system for printing amount information of plural digits comprising:
    means for introducing amount information represented as a numerical character string;
    means for determining the order position of each numeral character representing said amount information;
    means, responsive to the order position of each numerical character determined by said means for determining, for generating non-numerical symbology representative of the order position of said amount information; and
    means, responsive to said means for generating, for printing said non-numerical symbology representative of said amount information.

9. The printing system of claim 8 wherein said non-numerical symbology consists essentially of alphabetical characters.

10. A printing system for printing amount information of plural digits comprising:
    means for introducing amount information represented as a numerical character string;
    means for determining the order position of each numerical character representing said amount information;
    means, responsive to the order position of each numerical character determined by said means for determining, and to the value of each said numerical character, for generating non-numerical symbology representative of the value and order position of said amount information; and
    means, responsive to said means for generating, for printing said non-numerical symbology representative of said amount information.

11. The printing system of claim 10 wherein said means for introducing includes numerical data memory means for storing said numerical character string representing said amount information.

12. The printing system of claim 11 further comprising timing control means for supplying the numerical character string stored in said numerical data memory means to said means for converting one numerical character at a time.

13. The printing system of claim 10 wherein said non-numerical symbology consists essentially of alphabetical characters.

* * * * *